United States Patent [19]

Orr

[11] Patent Number: 4,996,638
[45] Date of Patent: Feb. 26, 1991

[54] METHOD OF FEEDBACK REGULATING A FLYBACK POWER CONVERTER

[75] Inventor: Raymond K. Orr, Kanata, Canada

[73] Assignee: Northern Telecom Limited, Montreal, Canada

[21] Appl. No.: 480,392

[22] Filed: Feb. 15, 1990

[51] Int. Cl.⁵ .......................................... H02M 3/335
[52] U.S. Cl. .......................................... 363/21; 363/97
[58] Field of Search .................................... 363/21, 97

[56] References Cited

U.S. PATENT DOCUMENTS

| | | | |
|---|---|---|---|
| 4,135,233 | 1/1979 | Seiersen | 363/21 |
| 4,559,591 | 12/1985 | Grünsch | 363/21 |
| 4,628,429 | 12/1986 | Walker | 363/21 |

FOREIGN PATENT DOCUMENTS 1220074 3/1986 U.S.S.R.

Primary Examiner—William H. Beha, Jr.
Attorney, Agent, or Firm—Jean-Pierre Fortin

[57] ABSTRACT

A method of providing power regulation in power conversion equipment, where power regulation is implemented on the primary side of a transformer used to provide isolation of a power source from the load. The feedback mechanism utilizes current perturbations which are summed with the primary current in the power transformer. These perturbations are transformed with the load current to the primary side of the power transformer and extracted using signal processing means to regenerate a useful signal which is isolated from the load.

7 Claims, 3 Drawing Sheets

METHOD OF FEEDBACK REGULATING A FLYBACK POWER CONVERTER

FIELD OF THE INVENTION

This invention relates to power conversion and regulation and more particularly to an apparatus and method by which a feedback control signal is transmitted through a power transformer from an output load.

BACKGROUND OF THE INVENTION

In power conversion equipment, power regulation is sometimes implemented on the primary side of a transformer which is used to provide isolation of the load from a power source. Virtually all power control equipment requiring isolated feedback from the load use either a feedback transformer or an optical transmission medium.

In the first instance, a feedback transformer is used in addition to the power transformer. Feedback signals are transmitted to the primary control circuit, via the feedback transformer. This signal includes information which may be in the form of a stream of digital pulses or a continuously variable amplitude modulated signal.

With the second of these feedback schemes, an optical coupler is used as a transmission medium and provides a feedback path while maintaining isolation. The feedback signal as in the first instance, may be in the form of a stream of digital pulses of light or an analog signal which varies in intensity continuously.

The problem associated with the above feedback schemes, is that they require a separate isolated feedback loop, making these expensive to implement and manufacture.

SUMMARY OF THE INVENTION

It is therefore an object of the present invention to provide a power converter circuit which eliminates the problem associated with the prior art designs.

Another object of the present invention is to provide a power converter which does not require a separate isolated feedback loop to control power at the load.

Yet another object of the present invention is to provide a power converter which utilizes a feedback path through the power transformer to provide voltage regulation at the isolated load.

According to an aspect of the present invention, there is provided in a flyback power converter, having a primary and a secondary, a method of regulating voltage at an isolated output load, comprising the steps of: (a) comparing the voltage across said load with a reference to obtain an error signal; (b) comparing said error signal with a ramp signal to obtain a pulse signal which varies in time according to the amplitude of said error signal; (c) feeding said pulse signal to said secondary so that it becomes induced at said primary, said pulse signal being summed to the magnetizing current of said primary to provide a control signal when said primary is energized; (d) detecting the presence of said pulse signal on said control signal; and (e) cutting power to said primary according to the presence in time of said pulse signal on said control signal to thereby compensate for voltage variations at the output load.

DESCRIPTION OF THE PREFERRED EMBODIMENT

Figure 1:
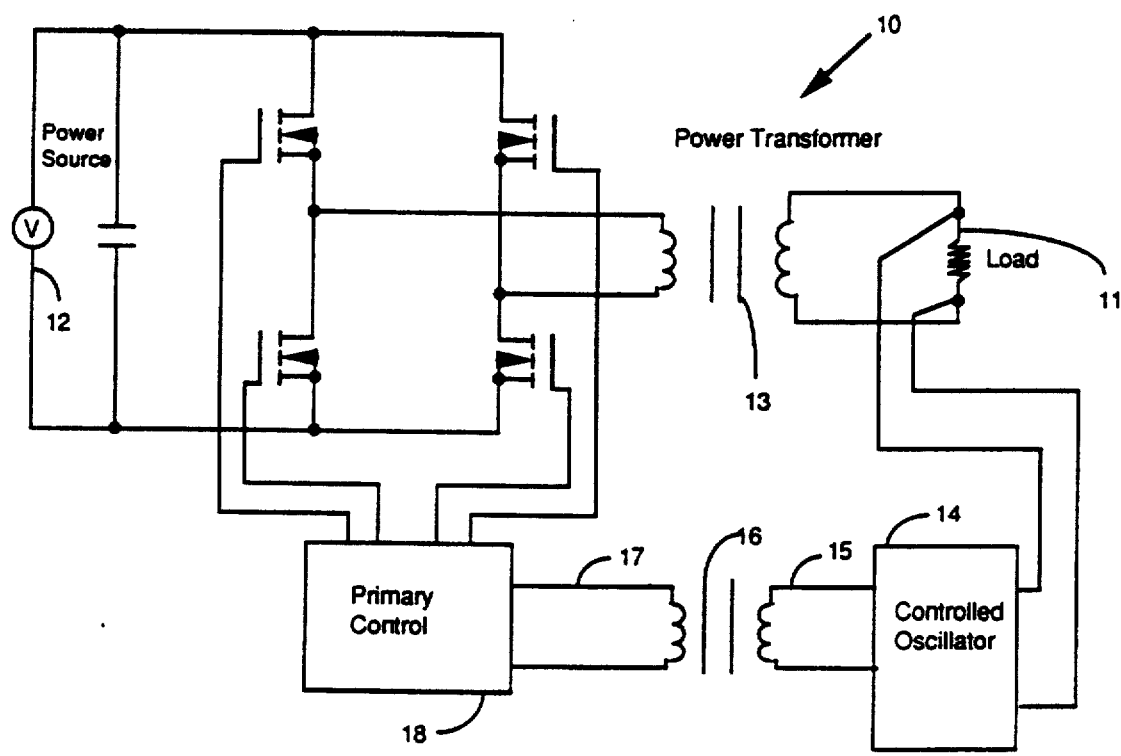
FIG. 1 is a prior art power converter using a transformer feedback loop.

Referring now to FIG. 1, we have shown a block diagram of a power converter circuit 10 adapted to provide power regulation of an isolated load 11. The load 11 is isolated from the power source 12 by means of a power transformer 13. Variations of a parameter such as voltage, current or both, at the load, is measured and modulated by means of a controlled oscillator 14. The signal may either be in the form of a stream of digital pulses or a continuously variable amplitude modulated signal. This signal is induced from the secondary side 15 of transformer 16 into the primary side 17. The signal is then used by the primary control circuit 18 to adjust power on the primary side of the power transformer 13.

Figure 2:
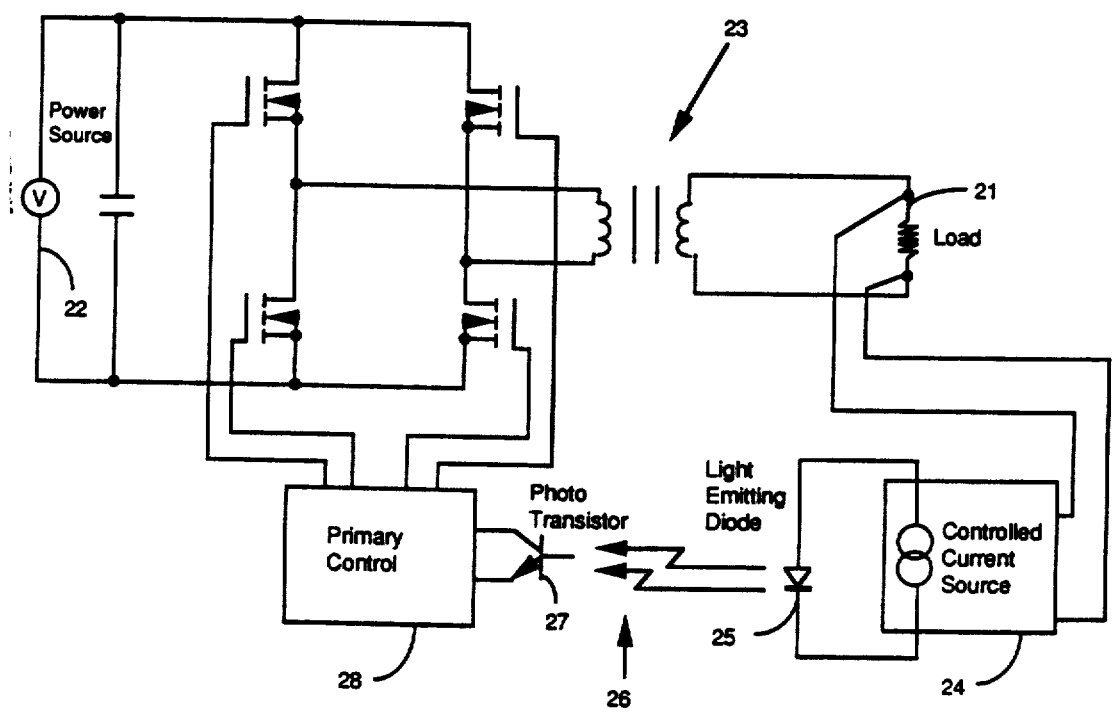
FIG. 2 is a prior art power converter using an optical feedback loop.

In the power control circuit of FIG. 2, the load 21 is similarly isolated from the power source 22 by means of a power transformer 23. An indication of variations of power parameters which are measured at load 21, is sent to the primary control circuit 28, via a light transducer 26. The light transducer or coupler 26 includes a light emitting diode 25 at the input and a photo transistor 27 at the output. The feedback signal is produced by means of a controlled current source 24, which is used to modulate the intensity of the light signal out of diode 25. Similarly, diode 25 can be modulated to produce a stream of light pulses.

Figure 3:
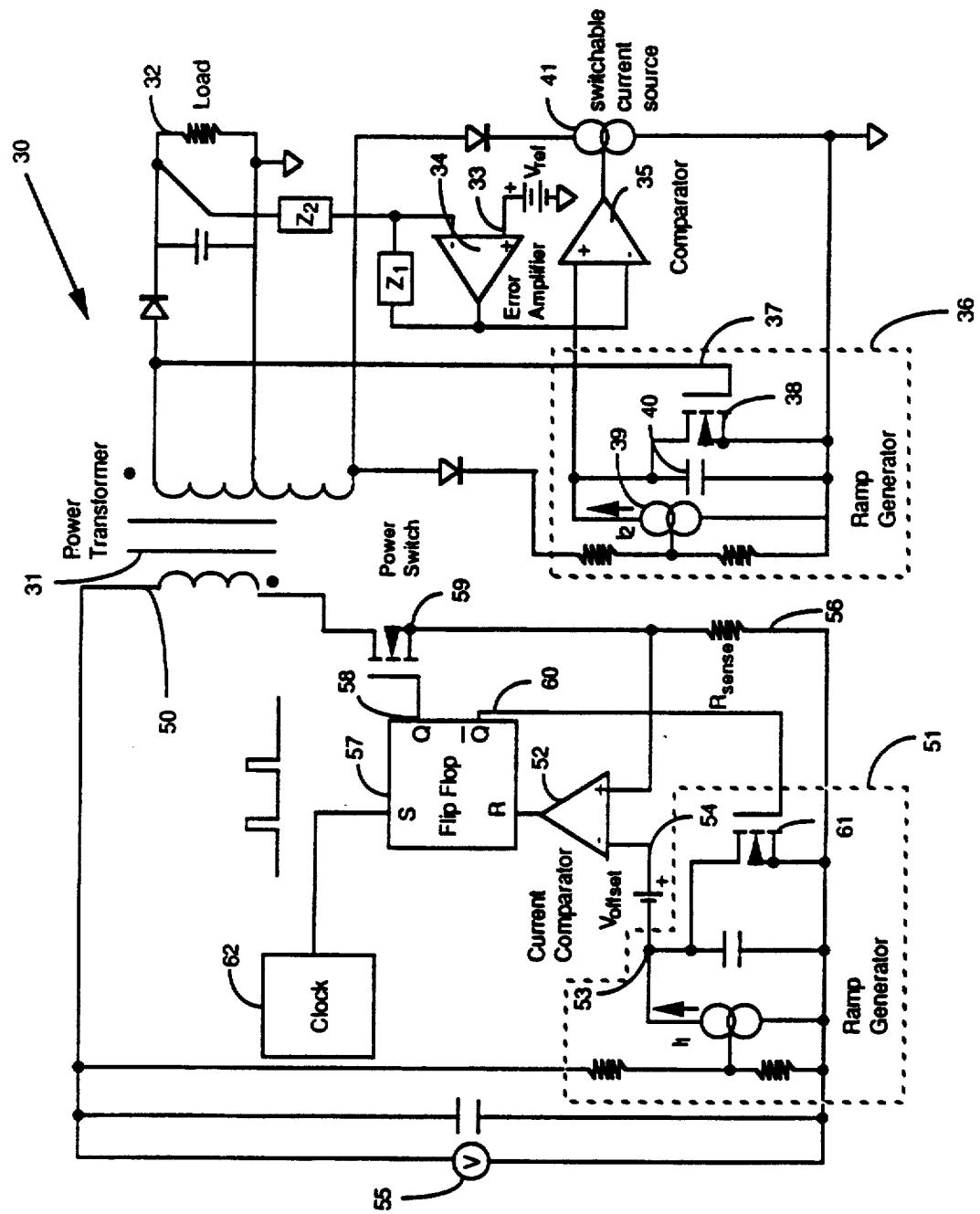
FIG. 3 is a schematic diagram of a power converter according to the preferred embodiment of the present invention.

The preferred embodiment of the invention is shown in FIG. 3. This embodiment illustrates a discontinuous mode flyback power converter 30 which utilizes a feedback path through the power transformer 31 to provide voltage regulation to load 32. Thus, the use of this circuit eliminates the need for a separate isolated feedback loop.

In this embodiment, the voltage across load 32 is compared with a voltage reference 33 by means of error amplifier 34. The voltage measured at load 32 is subtracted from reference voltage 33 and amplified to provide an error signal. This error signal is fed to the negative input of a feed forward comparator 35, where it is compared to a voltage ramp.

The voltage ramp is created by means of a ramp generator 36. This voltage ramp is initialized at the beginning of each forward cycle of the converter 30. In particular, at the forward cycle, when the secondary side of power transformer 31 becomes energized, the gate 37 of FET 38 goes low and the FET is switched off. When FET 38 is switched off, current source 39 charges capacitor 40 until the FET is switched on again. This process generates a ramp, which is fed to the positive input of comparator 35. Comparator 35, will generate a pulse each time the ramp voltage exceeds the error voltage. Therefore, the position in time of the rising edge of the pulses, will be determined by the slope of the ramp and the error voltage. Thus, if the error signal is small, a pulse will be triggered soon after the ramp is initiated. However, if the error signal is large, a pulse will be triggered later in time.

The pulse which is generated by comparator 35, is fed to a current source 41 which is switched on and off in response to the rising and falling edge of this pulse. The on/off switching of the current source will create a rectangular current pulse. Since current source 41 is connected to the secondary winding of power transformer 31, this rectangular current pulse will be induced and summed with the magnetizing current on the primary side 50 of the transformer 31. This magnetizing current has the form of a linear ramp because the voltage applied to the primary winding 50 is constant. This occurs each time the transformer is energized.

Accordingly the resulting signal will be a ramp with rectangular perturbation. The position of this perturbation will vary in time according to when current source 41 is turned on and off.

On the primary side 50, transformer 31 is provided with ramp generator 51 which operates like the ramp generator 36 on the secondary side of the transformer. In this circuit, the negative input of a current comparator 52 is connected to the ramp generator 51, which has an output 53, which is shifted up by means of an offset voltage source 54. A ramp with a slope which is proportional to the input voltage 55 of the power converter 30 is thus fed to the negative input of the current comparator 52. Accordingly, the ramp generated and shifted up has the same slope as the voltage ramp which results from the magnetizing current flowing through the current sense resistor 56. However, the latter has a rectangular perturbation on each ramp.

In operation, when the slope of the current waveform on the primary side 50 of transformer 31 increases, the voltage drop across sensing resistor 56 also increases. The ramp generated at output 53 is scaled so as to emulate the voltage ramp across sense resistor 56 resulting from the magnetizing current which flows through it from primary 50. When a rectangular perturbation occurs on the current ramp through current sensing resistor 56, the voltage at positive input of current comparator 52 exceeds the voltage at the negative input because the rectangular perturbation is greater than voltage offset 54. Thus, the voltage offset determines the threshold at which a perturbation will switch current comparator 52. The location in time of this perturbation, as indicated above, is dependent on the amplitude of the error signal, the resulting pulse at the output of comparator 35 and the time a pulse is generated at current source 41. As a result, the location in time of this pulse at the output of current comparator 52 is also dependent on these factors.

Each time a pulse appears at the output of comparator 52, flip-flop 57 is reset. When reset, the Q output 58 of the flip-flop goes low, therefore switching FET 59 off. When FET 59 is switched off, the power across transformer 31 is also switched off. Similarly, when reset, the (Q bar) output 60 of flip-flop 57 goes high, therefore switching on FET 61 of ramp generator 51. With FET 61 switched on, the generator is caused to turn off as well. When FET 59 is switched on the voltage applied to primary 50 is essentially constant because the voltage appearing across FET 59 and sensing resistor 56 is very small with respect to the input voltage 55.

The flip-flop 57 is set again on the next clock pulse from clock 62. When the flip-flop is set, the Q output 58 goes high, FET 59 is switched on and FET 61 switched off. With FET 59 switched on, power is again applied to transformer 33. With FET 61 switched off, ramp generator 51 begins a new ramp.

Accordingly, this technique permits the use of a small positive going current pulse from switchable current source 41, induced in the primary 50 of the power transformer 31 to terminate each switching cycle in a controlled way. The result is that the error signal determines the time the power switch, or FET 59 remains on after each clock pulse.

If the ramp slope from ramp generator 36 is made to be proportional to the input voltage 55 of the power converter, a feed-forward circuit configuration is obtained. This arrangement further enhances the line regulation of the power converter by inherently compensating for variations in input voltage independently of the error signal.

What is claimed is:

1. In a flyback power converter, having a primary and a secondary, a method of regulating voltage at an isolated output load, comprising the steps of:
   (a) comparing the voltage across said load with a reference to obtain an error signal;
   (b) comparing said error signal with a ramp signal to obtain a perturbation signal which varies in time according to the amplitude of said error signal;
   (c) feeding said perturbation signal to said secondary so that it becomes induced at said primary, said perturbation signal being summed to the magnetizing current of said primary to provide a control signal when said primary is energized;
   (d) detecting at the primary, the presence of said perturbation signal on said control signal; and
   (e) regulating the voltage at said primary according to the presence in time of said perturbation signal on said control signal to thereby compensate for voltage variations at the output load.

2. A method as defined in claim 1, wherein said ramp signal is generated at said secondary when voltage is induced thereto from said primary.

3. A method as defined in claim 2, further comprising the steps of switching a current source on and off, in response to said perturbation signal to produce a current waveform with pulses that vary in time according to the amplitude of said error signal.

4. A method as defined in claim 3, wherein said control signal comprises a ramp waveform generated when said primary is energized, on which is superimposed an amplitude perturbation corresponding to said pulses of said current waveform.

5. A method as defined in claim 4, wherein said amplitude perturbations are detected by comparing said control signal with a ramp signal generated at said primary when said primary is energized.

6. A method as defined in claim 5, wherein power to said primary is removed when a perturbation is detected on said control signal.

7. In a flyback power converter, having a primary and a secondary, a method of regulating voltage at an isolated output load, comprising the steps of:
   (a) measuring the voltage across said load;
   (b) comparing said measured voltage with a reference to obtain an error signal;
   (c) generating a first ramp signal on said secondary when voltage is induced thereto from said primary;
   (d) comparing said first ramp signal with said error signal so as to obtain a perturbation signal which varies in time according to the amplitude of said error signal;
   (e) switching a current source on and off, in response to said perturbation signal to produce a current waveform with pulses which vary in time according to the amplitude of said error signal;
   (f) feeding said current waveform to said secondary so that it becomes induced at said primary, said current waveform being summed to the magnetizing current of said primary to provide a control signal when said primary is energized;

(g) generating a third ramp signal at said primary;

(h) comparing the voltage drop of said control signal across a sensing resistor with said third ramp signal, to recover said perturbation signal;

(i) opening a switch such that voltage across said primary is cut at each pulse of said perturbation signal; and (j) closing said switch after a predetermined interval such that voltage is re-applied across said primary.

* * * * *